_(1)_

3,631,148
2,6-BIS(3,5-DIALKYL-4-HYDROXYBENZYL) CYCLOALKANONES

Robert A. Krueger, Cuyahoga Falls, Ohio, assignor to The B. F. Goodrich Company, New York, N.Y.
No Drawing. Original application Nov. 1, 1967, Ser. No. 679,622. Divided and this application Apr. 9, 1970, Ser. No. 31,442
Int. Cl. C08f 45/58
U.S. Cl. 260—45.85    6 Claims

ABSTRACT OF THE DISCLOSURE

Disclosed are novel 2,6-bis(3,5-dialkyl-4-hydroxybenzyl)cycloalkanones which are useful antioxidants for olefin polymers. The particular 2,6-bis(3,5-dialkyl-4-hydroxybenzyl)cycloalkanones of this invention have the formula

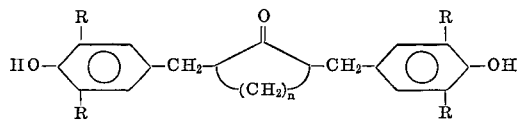

wherein R is a hydrocarbon radical and $n$ is an integer of 2 or 3. These compounds are useful as protective agents for poly(ethylene), poly(4-methylpentene-1), poly(propylene) and other olefin polymers.

---

This is a division of application Ser. No. 679,622 filed Nov. 1, 1967.

BACKGROUND OF THE INVENTION

Hindered phenols are recognized as useful protective agents against the deleterious affects of oxygen for a wide variety of materials including polymeric materials, oils, fats, etc. Of much recent interest are antioxidants of the hindered phenol type wherein the hindered phenol is attached to an ester function, especially where the carbonyl of the ester moiety is separated from the aromatic ring of the phenol moiety by two carbon atoms, that is, the carbonyl is in the beta position. Many feel that the enhanced reactivity of these compounds towards oxygen is due to the carbonyl group in the beta position.

Although molecular weight by itself is not the sole consideration in the choice of an antioxidant it is nevertheless an important factor. In general, higher molecular weight materials are less volatile and therefore better suited for use with polymeric materials which often are processed at elevated temperatures, however, for most efficient protection the weight ratio of hindered phenol to overall molecular weight of the compound should also be high.

SUMMARY OF THE INVENTION

I have now prepared 2,6-bis(3,5-dialkyl-4-hydroxybenzyl)cycloalkanones which are useful antioxidants for olefin polymers. The 2,6-bis(3,5-dialkyl-4-hydroxybenzyl) cycloalkanones are unusual in that they contain a single carbonyl group which is beta to two hindered phenol groups. These compounds provide high molecular weight materials having a high weight ratio of hindered phenol to overall molecular weight. The 2,6-bis(3,5-dialkyl-4-hydroxybenzyl(cycloalkanones of the present invention are particularly effective antioxidants for olefin polymers such as poly(ethylene), poly(propylene), poly(butene-1), poly(isobutylene), poly(4-methylpentene-1) and ethylene-propylene polymers.

DETAILED DESCRIPTION OF THE INVENTION

The novel 2,6-bis(3,5-dialkyl-4-hydroxybenzyl)cycloalkanones of this invention have the structural formula

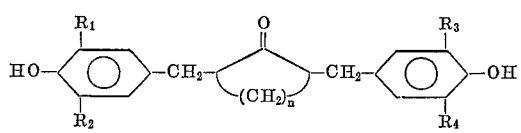

wherein $R_1$, $R_2$, $R_3$ and $R_4$ are alkyl, cycloalkyl or aryl groups either the same or different having from 1 to 8 carbon atoms and $n$ is 2 or 3. Especially preferred antioxidants of the present invention are compounds wherein $R_1$, $R_2$, $R_3$ and $R_4$ are tertiary alkyl groups containing from 4 to 8 carbon atoms. Such tertiary alkyl groups will include tertiary-butyl, 1,1,3-trimethylpropyl, 1,1,2-trimethylpropyl, 1-methyl-1-ethylpropyl, 1,1-diethylpropyl, 1,1,2,2-tetramethylpropyl, 1,1,3-trimethylbutyl, 1,1,2-trimethylbutyl, 1,1-dimethylpentyl and the like. Especially effective antioxidants will contain two tertiary butyl groups adjacent to the hydroxyl group on the aromatic nucleus, such as 2,6-bis(3,5-di-tertiary-butyl-4-hydroxybenzyl)cyclohexanone and 2,6-bis(3,5-di-tertiary-butyl-4-hydroxybenzyl)cyclopentanone.

The 2,6-bis(3,5-dialkyl - 4 - hydroxybenzyl)cycloalkanones are high melting crystalline solids, generally having melting points above about 200° C., which are soluble in a wide variety of solvents. Suitable solvents include: organic hydrocarbons such as benzene, toluene, hexane, heptane and the like; chlorinated hydrocarbons such as chlorobenzene and carbon tetrachloride; alcohols such as methanol, ethanol and isopropanol; ketones such as acetone and methylethyl ketone and the like.

Preparation of the 2,6-bis(3,5-dialkyl-4-hydroxybenzyl)cycloalkanones of the present invention is conveniently carried out by reacting an enamine of cyclopentanone or cyclohexanone with a molar excess of a 3,5-dialkyl-4-hydroxybenzyl halide. The reaction is normally conducted at atmospheric pressure in a solvent such as methanol, dioxane, toluene, benzene or the like at a temperature ranging between about 50° C. and 150° C. Following the reaction the reaction product is hydrolyzed by treating with water for about 15 to 30 minutes to obtain the 2,6-bis(3,5-dialkyl-4-hydroxybenzyl)cycloalkanone.

The compounds of this invention are useful as protective agents for a wide variety of polymeric materials susceptible to oxidative degradation. In general, polymeric materials derived from the polymerization of olefin monomers containing a vinylidene ($CH_2=C<$) grouping and containing from 2 to 9 carbon atoms are found to be effectively protected. Polymerizable monomers of the above type include: olefins such as ethylene, propylene, butene-1, pentene-1, hexene-1, octene-1, isobutylene, 4-methylpentene-1, methylbutene-1, 2-methylhexene-1, and 2-ethylhexene-1; di- and polyolefins such as 1,4-pentadiene, 1,4-hexadiene, 1,5-hexadiene, 1,4,7-octatriene, butadiene and isoprene; mixture and the like. The above-mentioned monomers may be homopolymerized or mixtures of one or more of these monomers may be copolymerized to form the polymerizates useful for the present invention.

Small amounts of the 2,6-bis(3,5-dialkyl-4-hydroxybenzyl(cycloalkanones are particularly effective antioxidants for poly(ethylene), poly(propylene), poly(butene-1), poly(isobutylene), poly(4-methylpentene - 1), ethylene-propylene copolymers and ethylene-propylene terpolymers wherein the third monomer is 1,4-hexadiene, 2-methyl-1,4-hexadiene, the dimethyl-1,4,9-decatrienes, diacyclopentadiene, vinyl cyclohexene, vinyl norbornene, ethylidene norbornene, methylene norbornene, norbornadiene, methyl norbornadiene, methyl tetrahydroindene or the like. They also find use in other polymers such as polystyrene, isobutylene-styrene copolymers, isobutylene-isoprene copolymers, polybutadiene, butadiene-styrene copolymers, butadiene-acrylonitrile copolymers, butadiene-vinyl pyridine copolymers, butadiene-acrylic acid copolymers, butadiene-alkyl acrylate or methacrylate copolymers, butadiene-chlorostyrene copolymers, butadiene-methyl vinyl ketone copolymers, polyisoprene, polychloroprene and the like, and other materials. The 2,6-bis(3,5-dialkyl-4-hydroxybenzyl)cycloalkanones may also be used as protective agents for other materials such as petroleum products, vegetable oils, animal fats and the like.

The antioxidants of the present invention are readily incorporated into the olefin polymers by conventional techniques and generally require no special processing. They are mixed into the olefin polymers as solids on a mill or with an internal mixer or kneader; in solutions or dispersions of the olefin polymers; or in solvents masterbatched with other compounding ingredients. They may be used in the olefin polymers in combination with other conventional compounding ingredients such as processing oils, plasticizers, lubricants, anti-sticking agents, fillers, pigments, reinforcing agents, sulfur and other curing agents, accelerators, stabilizers, antioxidants, antiozonants, and the like.

In combination with other antioxidants, the 2,6-bis(3,5-dialkyl-4-hydroxybenzyl)cycloalkanones often show synergistic activity. Other antioxidants which may be used in combination with the compounds of this invention include amines and their derivatives and phenols and their derivatives, such as:

2,6-ditertiary-p-cresol;
2,2'-methylenebis(6-tertiary-butyl-p-cresol);
2,2'-methylenebis[6-(2-methylcyclohexyl)p--cresol];
4,4'-butylidenebis(6-tertiary-butyl-m-cresol);
4,4'-ethylidenedi-o-cresol;
4,4'-thiobis(6-tertiary-butyl-m-cresol);
1,5-naphthalenediol;
1,1'-thiodi-2-naphthol;
p,p'-biphenol;
N-phenyl-l-naphthylamine;
N-phenyl-2-naphthylamine;
N,N'-di-2-naphthyl-p-phenylenediamine;
1,1'-thiobis(N-phenyl-2-naphthylamine);
N,N'-(iminodiethylene)bisoctadecanamide;

salts or amides of 3,3'-thiodipropionate;
dilaurylthiodipropionate;
1,2-dihydro-2,2,4-trimethyl-6-phenylquinoline;
2-benzimidazolethiol;
5,5-dimethylacridan;

and the like.

The amount of the 2,6-bis(3,5-dialkyl-4-hydroxybenzyl)cycloalkanones employed will vary with the particular olefin polymer to be protected. Generally, however, the 2,6-bis(3,5 - dialkyl-4-hydroxybenzyl)cycloalkanones will range between about 0.01% by weight and about 10% by weight based on the polymer and more preferably between about 0.05% and 4% by weight. If used in combination with another antioxidant, the combined antioxidant level will not exceed 10% by weight based on the polymer and preferably will be from 0.1 to 5%.

The following examples illustrate the invention more fully, however, they are not intended to limit the scope thereof. All parts and percentages are reported on a weight basis unless indicated otherwise.

Example I 2,6-bis(3,5 - di - tertiary-butyl-4-hydroxybenzyl)cyclohexanone was prepared by first dissolving 15 grams (0.1 mol) of 1-(N-pyrolydyl)cyclohexene and 25.5 grams (0.1 mol) of 3,5-di-tertiary-butyl-4-hydroxybenzyl chloride in about 75 mls. of dioxane and then heating the reaction mixture at reflux for about 2.5 hours. About 15 mls. of water was added and the mixture stirred an additional 15 minutes. Fractional distillation of the reaction mixture at reduced pressure (0.08 mm. Hg) yielded several viscous fractions collected between 147° C. and 183° C. which when combined and recrystallized from isopropyl alcohol gave a light powder, melting point 87–88° C. Analytical data indicated this product was the mono-substituted derivative, 2-(3,5-di-tertiary - butyl-4-hydroxybenzyl)cyclohexanone. The pot residue remaining after fractionation was twice recrystallized from isopropyl alcohol. The resulting white crystalline product had a melting point of 221–223° C. and nuclear magnetic resonance analysis confirmed the compound was 2,6-bis(3,5-di-tertiary-butyl-4-hydroxybenzyl)cyclohexanone.

Example II 2,6-bis(3,5 - di - tertiary-butyl-4-hydroxybenzyl)cyclohexanone was incorporated into a poly(4-methylpentene-1) polymer to demonstrate its use as an antioxidant. The particular poly(4-methylpentene-1) polymer employed was an olefin copolymer containing about 95 to 97% 4-methylpentene-1 interpolymerized and having a density of 0.83. The 2,6-bis(3,5-di-tertiary - butyl-4-hydroxybenzyl)cyclohexanone was dissolved in 100 mls. acetone and 10 grams of the poly(4-methylpentene-1) copolymer added. The mixture was then stripped to dryness in a rotary evaporator and the resulting powder pressed into 5" x 5" squares having a thickness of 11–14 mils. The pressing operation was conducted at 270° C. and 20,000 p.s.i. for 10 minutes after 5 minutes of preheating at moderate pressure.

A modified Scott Tester Block was used to measure the oxygen absorption. One inch circles were cut from the 0.012" sheets and pressed onto aluminum screen with heat and pressure. Six samples were placed in each testing tube and the system thoroughly flushed and filled with oxygen. The tubes were maintained at 140° C. and the induction periods determining by noting the oxygen absorption at regular intervals. Results of the oxygen absorption tests are set forth in Table I below. Results reported in Table I include a control polymer which contains no antioxidant as well as polymers containing the 2,6-bis(3,5-di-tertiary-butyl - 4 - hydroxybenzyl)cyclohexanone alone and in combination with dilaurylthiodipropionate.

TABLE I

| | Induction period (hours) |
|---|---|
| Control (no antioxidant) | 4 |
| 2,6-bis(3,5-di-tertiary-butyl-4-hydroxybenzyl)cyclohexanone (0.1 phr.) | 66 |
| 2,6-bis(3,5-di-tertiary-butyl-4-hydroxybenzyl)cyclohexanone (0.1 phr.)+dilaurylthiodipropionate (0.2 phr.) | 294 |
| Dilaurylthiodipropionate (0.2 phr.) | 10 |

Samples were also subjected to 125° C. temperatures in an air-circulating oven for prolonged periods. At regular intervals the samples were removed from the oven and analyzed by infra-red to determine if a significant increase in carbonyl content had occurred, and if so, the samples were deemed to have failed. Table II reports the results of one such oven-aging test.

TABLE II

| | Hours to failure |
|---|---|
| Control (no antioxidant) | 24 |
| 2,6-bis(3,5-di-tertiary-butyl-4-hydroxybenzyl) cyclohexanone (0.1 phr.) | 670 |
| 2,6-bis(3,5-di-tertiary-butyl-4-hydroxybenzyl) cyclohexanone (0.1 phr.)+dilaurylthiodipropionate (0.2 phr.) | 840 |

When the 2,6-bis(3,5-di-tertiary-butyl-4-hydroxybenzyl) cyclopentanone was employed, similar results were obtained—the compounds proving to be effective antioxidants for poly(4-methylpentene-1) subjected to the 140° C. oxygen absorption test or the 125° C. air-circulating oven test.

The 2,6-bis(3,5-di-tertiary - butyl-4-hydroxybenzyl)cyclohexanone is over three times more effective as a protective agent than the 2-(3,5-di-tertiary-butyl-4-hydroxybenzyl)cyclohexanone.

Example III

The antioxidants of this invention were tested in high-density polyethylene. The 2,6-bis(3,5-di-tertiary-butyl-4-hydroxybenzyl)cyclohexanone and several commercial antioxidants were separately weighed, dissolved in acetone and then added to the unstabilized high-density polyethylene (density=0.96) suspended in acetone. The mixture was stripped to dryness in a flash evaporator and milled for about 5 minutes at 290–300° F. The polymer was then compression molded into 0.010″ thick sheets. Samples cut from these sheets were then tested for oxygen absorption in accordance with the procedure described in Example II. Oxygen absorption data is set forth in Table III.

TABLE III

| | Induction period (hours) |
|---|---|
| Control (no antioxidant) | 3 |
| 2,6-bis(3,5-di-tertiary - butyl - 4 - hydroxybenzyl)cyclohexanone (0.1 phr.) | 103 |
| Octadecyl 2 - (3,5-di-tertiary-butyl-4-hydroxyphenyl) propionate (0.1 phr.) [1] | 77 |
| Pentaerythrityl tetrakis 2-(3,5-di-tertiary-butyl-4-hydroxyphenyl)propionate (0.1 phr.) [1] | 78 |
| 1,1,3-tris(5-tertiary-butyl - 2 - methyl-4-hydroxyphenyl)butane (0.1 phr.) [1] | 78 |
| 2,6-bis(3,5-di-tertiary - butyl - 4 - hydroxybenzyl)cyclohexanone (0.1 phr.) +dilaurylthiodipropionate (0.2 phr.) | 192 |
| Dilaurylthiodipropionate (0.3 phr.) | 55 |

[1] Commercial antioxidants.

The sample containing 0.1 phr. 2,6-bis(3,5-di-tertiary-butyl - 4 - hydroxybenzyl)cyclohexanone withstood about 840 hours in the air-circulating oven at 125° C. before failure.

The 2,6-bis(3,5-di-tertiary - butyl - 4 - hydroxybenzyl) cyclohexanone also gave improved oxidative stability when tested in a typical oil-extended styrene-butadiene copolymer as might be used for tire treads and an ethylene, propylene, 1,4-hexadiene terpolymer.

The examples clearly demonstrate the effectiveness of the novel 2,6-bis(3,5-dialkyl-4-hydroxybenzyl)cycloalkanones of the present invention as antioxidants for olefin polymers. It is evident from Tables I, II and III that the oxidative stability of high-density polyethylene and poly (4-methylpentene-1) which has been subjected to an oxygen atmosphere at 140° C. or air at 125° C. is markedly improved. In the oxygen absorption test, the 2,6-bis(3,5-di-tertiary-butyl - 4 - hydroxybenzyl)cyclohexanone performs better than antioxidants having similar structures which are widely used throughout the industry. When combined with dilaurylthiodipropionate, the 2,6-bis(3,5-dialkyl-4-hydroxybenzyl)cycloalkanones give a synergistic effect.

I claim:

1. A composition comprising a synthetic olefin polymer and about 0.01% to 10% based on the weight of the polymer of a 2,6-bis(3,5-dialkyl-4-hydroxybenzyl)cycloalkanone having the formula

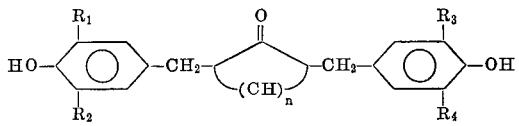

wherein $R_1$, $R_2$, $R_3$ and $R_4$ are tertiary alkyl groups containing from 4 to 8 carbon atoms and $n$ is 2 or 3.

2. The composition of claim 1, wherein the 2,6-bis(3,5-dialkyl-4-hydroxybenzyl)cycloalkanone is 2,6-bis(3,5-di-tertiary-butyl-4-hydroxybenzyl)cyclohexanone.

3. The composition of claim 1, wherein the 2,6-bis(3,5-dialkyl-4-hydroxybenzyl)cycloalkanone is 2,6-bis(3,5-di-tertiary-butyl-4-hydroxybenzyl)cyclopentanone.

4. The composition of claim 1, wherein the olefin polymer is poly(ethylene).

5. The composition of claim 1, wherein the olefin polymer is poly(4-methylpentene-1).

6. The composition of claim 1, which contains dilaurylthiodipropionate and a 2,6-bis(3,5-dialkyl-4-hydroxybenzyl)cycloalkanone in an amount not exceeding 10% based on the weight of the polymer.

References Cited

UNITED STATES PATENTS

| | | | |
|---|---|---|---|
| 2,803,660 | 8/1957 | Garber | 260—590 |
| 2,883,365 | 4/1959 | Mathes | 260—45.95 |
| 2,914,463 | 11/1959 | Beaver et al. | 252—404 |
| 2,894,004 | 7/1959 | Dietzler | 260—45.95 |

DONALD E. CZAJA, Primary Examiner

V. P. HOKE, Assistant Examiner

U.S. Cl. X.R.

99—163; 252—52 R, 404; 260—45.95